(12) United States Patent
Kobayashi et al.

(10) Patent No.: US 8,092,907 B2
(45) Date of Patent: *Jan. 10, 2012

(54) PRESSURE-SENSITIVE ADHESIVE COMPOSITIONS, PRESSURE-SENSITIVE ADHESIVE SHEETS AND SURFACE PROTECTING FILMS

(75) Inventors: Natsuki Kobayashi, Ibaraki (JP); Tatsumi Amano, Ibaraki (JP); Masahiko Ando, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 987 days.

This patent is subject to a terminal disclaimer.

(21) Appl. No.: 11/226,956

(22) Filed: Sep. 15, 2005

(65) Prior Publication Data

US 2006/0057371 A1    Mar. 16, 2006

(30) Foreign Application Priority Data

Sep. 16, 2004 (JP) ................................. 2004-269536
May 20, 2005 (JP) ................................. 2005-148181

(51) Int. Cl.
*B32B 7/12* (2006.01)
*B32B 27/30* (2006.01)

(52) U.S. Cl. ........... 428/355 AC; 428/355 EN; 526/931; 156/332

(58) Field of Classification Search ................. 526/931; 428/355 R, 411, 355 EN, 355 AC; 523/111; 156/332

See application file for complete search history.

(56) References Cited

U.S. PATENT DOCUMENTS

| | | | |
|---|---|---|---|
| 4,312,916 A | 1/1982 | Kakumaru et al. | |
| 4,668,730 A | 5/1987 | Iovine et al. | |
| 5,147,925 A | 9/1992 | Pears et al. | |
| 5,378,405 A * | 1/1995 | Gutman et al. | 252/500 |
| 5,433,892 A | 7/1995 | Czech | |
| 5,508,107 A | 4/1996 | Gutman et al. | |
| 5,591,820 A | 1/1997 | Kydonieus et al. | |
| 5,631,079 A | 5/1997 | Gutman et al. | |
| 5,635,564 A | 6/1997 | Wieditz et al. | |
| 5,885,708 A | 3/1999 | Lu et al. | |
| 5,952,398 A | 9/1999 | Dietz et al. | |
| 5,985,990 A | 11/1999 | Kantner et al. | |
| 6,548,605 B1 | 4/2003 | Morita et al. | |
| 6,562,428 B1 | 5/2003 | Ohrui | |
| 6,783,850 B2 | 8/2004 | Takizawa et al. | |
| 7,026,035 B2 * | 4/2006 | Yano et al. | 428/141 |
| 7,491,758 B2 | 2/2009 | Amano et al. | 524/99 |
| 7,691,925 B2 | 4/2010 | Amano et al. | 524/99 |
| 7,887,914 B2 | 2/2011 | Kobayashi et al. | 428/355 AC |
| 2002/0183442 A1 | 12/2002 | Wamprecht et al. | |
| 2003/0091818 A1 | 5/2003 | Bamba et al. | |
| 2004/0151903 A1 | 8/2004 | Niino et al. | |
| 2004/0189907 A1 | 9/2004 | Tominaga et al. | |
| 2005/0244633 A1 | 11/2005 | Kobayashi et al. | |
| 2005/0256251 A1 | 11/2005 | Amano et al. | |
| 2006/0045990 A1 | 3/2006 | Kim et al. | |
| 2006/0057368 A1 | 3/2006 | Kobayashi et al. | |
| 2008/0311395 A1 | 12/2008 | Ukei et al. | |

FOREIGN PATENT DOCUMENTS

| | | |
|---|---|---|
| CN | 1517418 | 8/2004 |
| EP | 0 435 080 | 7/1991 |
| EP | 0 961 792 | 6/2002 |
| EP | 1 591 506 | 11/2005 |
| EP | 1 595 929 A1 | 11/2005 |
| EP | 1 602 698 | 12/2005 |
| JP | 58-7470 | 1/1983 |
| JP | 2-080030 | 3/1990 |
| JP | 3-122165 | 5/1991 |
| JP | 5-9449 | 1/1993 |
| JP | 6-65551 | 3/1994 |
| JP | 6-100655 | 4/1994 |
| JP | 6-128539 | 5/1994 |
| JP | 7-104125 | 4/1995 |
| JP | 7-157741 | 6/1995 |
| JP | 7-310066 | 11/1995 |
| JP | 8-104857 | 4/1996 |
| JP | 8-155040 | 6/1996 |
| JP | 9-59581 | 3/1997 |
| JP | 9-87354 | 3/1997 |
| JP | 9-165460 | 6/1997 |
| JP | 11-256116 | 9/1999 |
| JP | 2980874 | 9/1999 |
| JP | 11-349910 A | 12/1999 |
| JP | 2000-44912 | 2/2000 |

(Continued)

OTHER PUBLICATIONS

Database WPI, Section Ch, Week 199423, Derwent Publications Ltd., London, GB: AN 1994-189173, XP002343566.
European Search Report issued on the related European Patent Application No. 05009331, dated Jul. 22, 2005.
European Search Report issued on the related European Patent Application No. 05010330, dated Sep. 19, 2005.
European Search Report issued on the corresponding European Patent Application No. 05020138, dated Nov. 28, 2005.
European Search Report issued on the related European Patent Application No. 05020102, dated Nov. 29, 2005.

(Continued)

*Primary Examiner* — Thao T. Tran
(74) *Attorney, Agent, or Firm* — Knobbe Martens Olson & Bear LLP (57) ABSTRACT

An object of the present invention is to provide a pressure-sensitive adhesive composition which is excellent in antistatic property of a non-electrification-prevented adherend (a subject to be protected) upon peeling, and has reduced stainability in an adherend and is excellent in adhesion reliance, and electrification preventing pressure-sensitive adhesive sheets and surface protecting films using the same. There is provided a pressure-sensitive adhesive composition, which comprises a (meth)acryl-based polymer containing, as a main component, a (meth)acryl-based monomer having an alkyl group of a carbon number of 6 to 14, wherein the pressure-sensitive adhesive composition contains an ethylene oxide group-containing compound and an alkali metal salt, and the alkali metal salt is contained at an amount of less than 1 part by weight relative to 100 parts by weight of the (meth)acryl-based polymer.

22 Claims, 1 Drawing Sheet

FOREIGN PATENT DOCUMENTS

| | | |
|---|---|---|
| JP | 2000-129235 | 5/2000 |
| JP | 2000-273417 | 10/2000 |
| JP | 2001-49205 | 2/2001 |
| JP | 2001-146581 | 5/2001 |
| JP | 2001-220474 | 8/2001 |
| JP | 2001-512508 | 8/2001 |
| JP | 2001-305346 | 10/2001 |
| JP | 2001-316643 | 11/2001 |
| JP | 2002-019039 | 1/2002 |
| JP | 2002-293870 | 10/2002 |
| JP | 2002-363510 A | 12/2002 |
| JP | 2003-41205 | 2/2003 |
| JP | 2003-147325 | 5/2003 |
| JP | 2004-107616 A | 4/2004 |
| JP | 2004-287199 A | 10/2004 |
| JP | 2005-200607 | 7/2005 |
| JP | 2005-206776 | 8/2005 |
| JP | 2007-536427 | 12/2007 |
| WO | WO 98/36005 | 8/1998 |
| WO | WO 00/24839 | 5/2000 |
| WO | WO 03/011958 | 2/2003 |

OTHER PUBLICATIONS

Information Offer Form submitted in the related Japanese Patent Application No. 2004-135167, dated Oct. 30, 2007.
Information Offer Form submitted in the related Japanese Patent Application No. 2005-076890, dated Dec. 17, 2007.
International Search Report issued on the related PCT Application No. PCT/JP2006/317458, dated Nov. 28, 2006.
Notice of Information Offer Form issued on the related Japanese Patent Application No. 2004-135167, dated Dec. 11, 2007.
Notice of Information Offer Form issued on the related Japanese Patent Application No. 2005-076890, dated Jan. 24, 2008.
File History of the related U.S. Patent Application No. 11/117,114, as of Aug. 12, 2008.
File History of the related U.S. Patent Application No. 11/128,489, as of Aug. 12, 2008.
File History of the related U.S. Patent Application No. 11/227,829, as of Aug. 12, 2008.
File History of the related U.S. Patent Application No. 12/065,653, as of Aug. 12, 2008.
Information Supplement submitted in the corresponding Japanese Patent Application No. 2005-148181, dated Jun. 16, 2008.
Notice of Information Supplement issued on the corresponding Japanese Patent Application No. 2005-148181, dated Jul. 22, 2008.
Shin-Nakamura Chemical Co., Ltd, "Product Name: NK Ester AM-90G", Jun. 2001, (Searching Date: May 28, 2008), URL:http://www.shin-nakamura.com/monoma/AM-90G.htm.
File History of the related U.S. Appl. No. 11/117,114, for the period of Aug. 13, 2008-Jun. 24, 2009.
File History of the related U.S. Appl. No. 11/128,489, for the period of Aug. 13, 2008-Jun. 24, 2009.
File History of the related U.S. Appl. No. 11/227,829, for the period of Aug. 13, 2008-Jun. 24, 2009.
File History of the related U.S. Appl. No. 12/065,653, for the period of Aug. 13, 2008-Jun. 24, 2009.
Fujimoto, T., *Shin Kaimenkasseizai Nyuumon*, 1996, p. 277.
Japanese Office Action issued on the corresponding Japanese Patent Application No. 2005-148181, dated Jun. 23, 2009.
File History of the related U.S. Appl. No. 11/117,114, for the period of Jun. 24, 2009-Aug. 10, 2009.
File History of the related U.S. Appl. No. 11/128,489, for the period of Jun. 24, 2009-Aug. 10, 2009.
File History of the related U.S. Appl. No. 11/227,829, for the period of Jun. 24, 2009-Aug. 10, 2009.
File History of the related U.S. Appl. No. 12/065,653, for the period of Jun. 24, 2009-Aug. 10, 2009.
Japanese Official Bulletin for the Information Statement submitted in the Japanese Patent Office on Aug. 19, 2009 in the corresponding Japanese Patent Application No. 2005-148181, dated Aug. 20, 2009.
File History of the related U.S. Appl. No. 11/117,114, for the period of Aug. 11, 2009-Oct. 14, 2009.
File History of the related U.S. Appl. No. 11/128,489, for the period of Aug. 11, 2009-Oct. 14, 2009.
File History of the related U.S. Appl. No. 11/227,829, for the period of Aug. 11, 2009-Oct. 14, 2009.
File History of the related U.S. Appl. No. 12/065,653, for the period of Aug. 11, 2009-Oct. 14, 2009.
Information Submission filed in the corresponding Japanese Patent Application No. 2005-148181, dated Sep. 11, 2009.
File History of the related U.S. Patent Application No. 11/117,114, for the period of Oct. 14, 2009-Nov. 18, 2009.
"Adhesive Hand Book, the first edition", edited by Japan Adhesive Tape Manufactures Association, Adhesive Hand Book Editorial Committee, Mar. 2, 1985, the front page, the contents page, p. 79 and the colophon.
Information Offer Form submitted in the corresponding Japanese Patent Application No. 2005-148181, dated Feb. 8, 2010.
File History of the related U.S. Appl. No. 11/117,114, for the period of Nov. 19, 2009-Mar. 17, 2010.
File History of the related U.S. Appl. No. 11/128,489, for the period of Oct. 15, 2009-Mar. 17, 2010.
File History of the related U.S. Appl. No. 11/227,829, for the period of Oct. 15, 2009-Mar. 17, 2010.
File History of the related U.S. Appl. No. 11/117,114, for the period of Mar. 18, 2010-May 3, 2010.
File History of the related U.S. Appl. No. 11/227,829, for the period of Mar. 18, 2010-May 3, 2010.
File History of the related U.S. Appl. No. 12/065,653, for the period of Oct. 15, 2009-May 3, 2010.
Information Offer Form submitted in the corresponding Japanese Patent Application No. 2005-148181, dated Apr. 22, 2010, mailed May 19, 2010 from the Japanese Patent Office.
"Electric Properties of Polymers" edited by Yasaku WADA, published by Shokabo Publishing Co., Ltd, Aug. 15, 1987.
File History of the related U.S. Appl. No. 11/117,114, for the period of May 4, 2010-Dec. 8, 2010.
File History of the related U.S. Appl. No. 11/128,489, for the period of Mar. 18, 2010-Dec. 8, 2010.
File History of the related U.S. Appl. No. 11/227,829, for the period of May 4, 2010-Dec. 8, 2010.
File History of the related U.S. Appl. No. 12/065,653, for the period of May 4, 2010-Dec. 8, 2010.
Office Action issued by the Taiwan Intellectual Property Office in the corresponding Taiwan Patent Application No. 094125822, dated Jan. 6, 2011.
Notice of Preliminary Rejection mailed by Korean Intellectual Property Office mailed on Aug. 30, 2011 in the corresponding Korean Patent Application No. 10-2010-0079874.
Material A provided by third party in letter dated Sep. 13, 2011.
Material B provided by third party in letter dated Sep. 13, 2011.
Material C provided by third party in letter dated Sep. 13, 2011.
Material D provided by third party in letter dated Sep. 13, 2011.

* cited by examiner

FIG. 1

PRESSURE-SENSITIVE ADHESIVE COMPOSITIONS, PRESSURE-SENSITIVE ADHESIVE SHEETS AND SURFACE PROTECTING FILMS

BACKGROUND OF THE INVENTION

1. Field of the Invention

The present invention relates to an acryl-based pressure-sensitive adhesive composition. More particularly, the present invention relates to antistatic pressure-sensitive adhesive compositions, and pressure-sensitive adhesive sheets and surface protecting films using the same.

Pressure-sensitive sheets comprising an antistatic pressure-sensitive adhesive composition of the present invention is suitably used in plastic products on which static electricity is easily generated. Among them, particularly, pressure-sensitive adhesive sheets of the present invention are useful as a surface protecting film (a protecting film) used for the purpose of protecting a surface of an optical member such as a polarizing plate, a wavelength plate, a retardation plate, an optical compensating film, a reflecting sheet, and a luminance improving film which are used as a liquid crystal display or the like.

2. Description of the Related Art

In recent years, upon transportation of optical appliances or electronic appliances and packaging of those parts on a printed board, individual parts are frequently transferred in the state where they are wrapped with a prescribed sheet, or in the state where they are applied to a pressure-sensitive adhesive tape. Among them, a surface protecting film is particularly widely used in the field of optical-electronic parts.

A surface protecting film is generally used for the purpose of preventing a scratch or a stain produced at processing or conveyance of a subject to be protected by applying to a subject to be protected via a pressure-sensitive adhesive layer coated on a protecting film side. For example, for the purpose of preventing a scratch or a stain, a surface protecting film is applied to an optical member such as a polarizing plate and a wavelength plate used in a panel of a liquid crystal display via a pressure-sensitive adhesive layer.

When a liquid crystal display is produced with these optical members, since a surface protecting film become unnecessary, it is peeled and removed from an optical member.

In general, since the aforementioned optical member, pressure-sensitive adhesive, and surface protecting film are constructed of a plastic material, they have high electrical insulating property and generate static electricity upon friction or peeling. Therefore, also when a protecting film is peeled from an optical member such as a polarizing plate, static electricity is generated. When a voltage is applied to a liquid crystal in the state where static electricity remains, orientation of a liquid crystal molecule is lost, and a defect of a panel is generated.

In addition, static electricity is a great problem in a step of manufacturing a liquid crystal display or a touch panel. Due to this static electricity, there arises a problem that a dust is attached to a surface protecting film or an optical member, and this pollutes an optical member. Then, in order to prevent such the disadvantage, a surface protecting film is subjected to various antistatic treatments.

Previously, as an attempt to suppress the aforementioned electrification of static electricity, for example, a method of preventing electrification by adding a low-molecular surfactant to a pressure-sensitive adhesive, and transferring a surfactant from a pressure-sensitive adhesive to an adherend has been disclosed (for example, see Patent Publication 1). However, the low-molecular surfactant is easily bled on a surface of a pressure-sensitive adhesive layer and, when applied to a surface protecting film, staining of an adherend (a subject to be protected) is feared. Therefore, when a pressure-sensitive adhesive with a low-molecular surfactant added thereto is applied to a surface protecting film, there is a problem that optical property of an optical member is deteriorated.

In addition, pressure-sensitive adhesive sheets in which an antistatic agent is contained in a pressure-sensitive adhesive layer (for example, see Patent Publication 2) are disclosed. For preventing bleeding of an antistatic agent onto the surface of a pressure-sensitive adhesive in such pressure-sensitive adhesive sheets, an antistatic agent comprising a polyether polyol compound and an alkali metal salt is added to an acryl-based pressure-sensitive adhesive. However, even if such pressure-sensitive adhesive sheets is used, the bleeding of the antistatic agent etc. is inevitable, and as a result, there is a problem that upon actual application to a surface protecting film, there occurs a phenomenon wherein due to the bleeding with time or upon treatment under high temperature conditions, the surface protecting film is partially peeled off from the subject to be protected.

As described above, in any of these, the aforementioned problems can not be solved well-balanced yet and, in the technical field associated with electronic appliances where electrification or staining becomes a particularly serious problem, it is difficult to correspond to demand of further improvement of an antistatic surface protecting film.

[Patent Publication 1] JP-A No.9-165460
[Patent Publication 2] JP-A No.6-128539

SUMMARY OF THE INVENTION

In light of such the circumstances, an object of the present invention is to solve problems to provide an antistatic pressure-sensitive adhesive composition which is excellent in antistatic property of a non-electrification-prevented adherend (a subject to be protected) upon peeling, and has reduced stainability in an adherend and is excellent in adhesion reliance, and electrification preventing pressure-sensitive adhesive sheets and surface protecting films using the same.

SUMMARY OF THE INVENTION

In order to solve the aforementioned problems, the present inventors intensively studied and, as a result, found out that the aforementioned object can be attained by a pressure-sensitive adhesive composition shown below, which resulted in completion of the present invention.

That is, a pressure-sensitive adhesive composition of the present invention is a pressure-sensitive adhesive composition comprising a (meth)acryl-based polymer containing, as a main component, a (meth)acryl-based monomer having an alkyl group of a carbon number of 6 to 14, wherein the pressure-sensitive adhesive composition contains an ethylene oxide group-containing compound and an alkali metal salt, and the alkali metal salt is contained at an amount of less than 1 part by weight relative to 100 parts by weight of the (meth)acryl-based polymer.

The (meth)acryl-based polymer in the present invention refers to an acryl-based polymer and/or a methacryl-based polymer. And the (meth)acryl-based monomer in the present invention refers to an acryl-based monomer and/or a methacryl-based monomer. Also, the (meth)acrylate in the present invention refers to an acrylate and/or a methacrylate.

According to the pressure-sensitive adhesive composition of the present invention, as shown in results of Examples, by using a pressure-sensitive adhesive composition comprising a (meth)acryl-based polymer containing, as a main component, a (meth)acryl-based monomer having an alkyl group of a carbon number of 6 to 14, and having an ethylene oxide group-containing compound and an alkali metal salt, electrification on an adherend (a subject to be protected) which has not been electrification-prevented is prevented upon peeling, and staining on an adherend (a subject to be protected) is reduced. Although details of the reason why the surface protecting film manifests such properties are not clear, it is presumed that use of a (meth)acryl-based polymer containing, as a main component, a (meth)acryl-based monomer having an alkyl group of a carbon number of 6 to 14, and having an ethylene oxide group-containing compound and an alkali metal salt, contributes to compatibility with an alkali metal salt, and well-balanced interaction such as conductivity, thereby, both of suppression of staining on the subject to be protected, and electrification property can be realized.

The pressure-sensitive adhesive composition of the present invention is characterized in that a (meth)acryl-based polymer containing, as a main component, a (meth)acryl-based monomer having an alkyl group of a carbon number of 6 to 14 is used.

In the present invention, an acid value of the (meth)acryl-based polymer is preferably 29 or less, more preferably 20 or less, further preferably 15 or less.

An acid value of a (meth)acryl-based polymer in the present invention refers to an mg number of potassium hydroxide necessary for neutralizing a free fatty acid and a resin acid contained in 1 g of a sample. In a (meth)acryl-based polymer having an acid value exceeding 29, excellent ability of preventing electrification on an adherend (a subject to be protected) is not obtained in some cases. It is presumed that, by the presence of many carboxyl groups and sulfonate groups having great interaction with an alkali metal salt in a (meth)acryl-based polymer skeleton, ion conduction is prevented, and excellent ability of preventing electrification on an adherend (a subject to be protected) is not obtained.

In the present invention, for exerting action as a pressure-sensitive adhesive composition, at least a (meth)acryl-based polymer containing, as a main component, a (meth)acryl-based monomer having an alkyl group of a carbon number of 6 to 14, an ethylene oxide group-containing compound, and an alkali metal salt are essential features.

The present invention is characterized in that an ethylene oxide group-containing compound is contained. By attaining interaction excellent in balance and compatibility with an alkali metal salt and a (meth)acryl-based polymer etc. by using the ethylene oxide group-containing compound, it is possible to obtain a surface protecting film which has antistatic property of a non-electrification-prevented adherend (a subject to be protected) upon peeling and has reduced stainability in an adherend.

The present invention is characterized in that an alkali metal salt is contained. By using an alkali metal salt to obtain affinity and well-balanced interaction with a (meth)acryl-based polymer, a surface protecting film which prevents electrification on an adherend (a subject to be protected) which has not been electrification-prevented upon peeling can be obtained.

In addition, the present invention is characterized in that a content of an alkali metal salt in the pressure-sensitive adhesive composition is less than 1 part by weight relative to 100 parts by weight of the (meth)acryl-based polymer. By a content of an alkali metal salt of less than 1 part by weight, a surface protecting film which reduces staining on an adherend (a subject to be protected) due to an alkali metal salt can be obtained.

Examples of an alkali metal salt which is used in the foregoing include a metal salt comprising lithium, sodium, or potassium and, among them, a lithium salt having high dissociating property is preferable.

In the present invention, the content of the ethylene oxide group in the ethylene oxide group-containing compound is preferably 5 to 85% by weight. By using such ethylene oxide group-containing compound, compatibility with the alkali metal salt can be improved thereby suppressing staining of a subject to be protected.

In addition, the present invention is characterized in that a (meth)acryl-based polymer further containing a (meth)acryl-based monomer having a hydroxyl group as a constituent component is used. By using a (meth)acryl-based monomer having a hydroxyl group, crosslinking of a pressure-sensitive adhesive composition is easily controlled and, consequently, balance between improvement in wettability due to fluidity and reduction in an adhesive strength on peeling is easily controlled. Further, since a hydroxyl group has appropriate interaction with an alkali metal salt and a polyether polyol compound unlike the aforementioned carboxyl group and sulfonate group which can generally act as a crosslinking site, the present invention can be also suitably used in a respect of electrification preventing property.

On the other hand, a pressure-sensitive adhesive layer of the present invention is characterized in that the aforementioned pressure-sensitive adhesive composition is crosslinked. By performing crosslinking by appropriately regulating a constitutional unit and a constitutional ratio of a (meth)acryl-based polymer, selection of a crosslinking agent, and an addition ratio, a pressure-sensitive adhesive sheet more excellent in heat resistance can be obtained.

In addition, a pressure-sensitive adhesive sheet is characterized in that the film has a pressure-sensitive adhesive layer, which is formed by crosslinking a pressure-sensitive adhesive composition as defined above on one side or both sides of a support. According to the pressure-sensitive adhesive sheet of the present invention, since the pressure-sensitive adhesive composition of the present invention exerting the aforementioned action and effect is used, electrification of a pressure-sensitive adhesive sheet can be prevented upon peeling, and a pressure-sensitive adhesive sheet which can reduce staining property on an adherend (a subject to be protected) can be obtained. For this reason, in particular, those sheets are very useful as an antistatic pressure-sensitive adhesive sheet in the technical field associated with an electron appliances in which electrification of static electricity and staining are a particularly serious problem.

Furthermore, when the pressure-sensitive adhesive composition of the present invention is applied to a surface protecting film, it is more preferable that a plastic substrate used in a surface protecting film is antistatic-treated. By antistatic-treating a plastic substrate, a peeling electrification voltage on an adherend (a subject to be protected) can be reduced more effectively, and further excellent electrification preventing ability is obtained.

Examples of electrification preventing treatment include a method of coating an antistatic resin consisting of an antistatic agent and a resin component or an electrically conducting resin containing an electrically conducting polymer or an electrically conducting substance, and a method of depositing or plating an electrically conducting substance.

According to the surface protecting film of the present invention, since the pressure-sensitive adhesive composition of the present invention exerting the aforementioned action and effect is used, electrification of a surface protecting film can be prevented upon peeling, and a surface protecting film which can reduce staining property on an adherend (a subject to be protected) can be obtained. For this reason, in particular, those films are very useful as an antistatic surface protecting film in the technical field associated with an electron appliances in which electrification of static electricity and staining are a particularly serious problem.

BEST MODE FOR CARRYING OUT THE INVENTION

Embodiments of the present invention will be explained in detail below.

A pressure-sensitive adhesive composition of the present invention is a pressure-sensitive adhesive composition of the present invention is a pressure-sensitive adhesive composition comprising a (meth)acryl-based polymer containing, as a main component, a (meth)acryl-based monomer having an alkyl group of a carbon number of 6 to 14, wherein the pressure-sensitive adhesive composition contains an ethylene oxide group-containing compound and an alkali metal salt, and the alkali metal salt is contained at an amount of less than 1 part by weight relative to 100 parts by weight of the (meth) acryl-based polymer.

A (meth)acryl-based polymer used in the present invention is not particularly limited as far as it is a (meth)acryl-based polymer having pressure-sensitive adhering property corresponding to the aforementioned property.

In the present invention, a (meth)acryl-based monomer having an alkyl group of a carbon number of 6 to 14 can be used, and it is more preferable to use a (meth)acryl-based monomer having an alkyl group of a carbon number of 7 to 13. Examples of (meth)acrylate having an alkyl group of a carbon number of 6 to 14 include hexyl(meth)acrylate, 2-ethylhexyl(meth)acrylate, n-octyl (meth)acrylate, isooctyl (meth)acrylate, n-nonyl(meth)acrylate, isononyl(meth)acrylate, n-decyl(meth)acrylate, isodecyl (meth)acrylate, n-dodecyl(meth)acrylate, n-tridecyl(meth)acrylate, and n-tetradecyl(meth)acrylate. Among them, 2-ethylhexyl (meth)acrylate, n-octyl(meth)acrylate, isooctyl(meth)acrylate, n-nonyl(meth)acrylate, isononyl(meth)acrylate, n-decyl (meth)acrylate, isodecyl(meth)acrylate, n-dodecyl(meth) acrylate, and n-tridecyl(meth)acrylate or the like are preferable to use for the present invention. In addition, in the present invention, (meth)acryl-based monomers having an alkyl group of a carbon number of 6 to 14 may be used alone, or two or more kinds may be used by mixing.

As other polymerizable monomer other than a (meth)acryl-based monomer having an alkyl group of a carbon number of 6 to 14, a polymerizable monomer for regulating a glass transition point or peelability of a (meth)acryl-based polymer can be used in such a range that the effect of the present invention is not deteriorated.

As other polymerizable monomer which is used in a (meth) acryl-based polymer, components other than (meth)acrylate having a carboxyl group, a sulfonate group, a phosphoric acid group, or an acid anhydride group can be used without any limitation. Among them, in particular, since control of crosslinking can be easily conducted, (meth)acrylate having a hydroxyl group are more preferably used.

In the present invention, an acid value of the (meth)acryl-based polymer is preferably 29 or less. Specifically, an acid value can be adjusted by an amount of (meth)acrylate having an acid functional group to be blended, and examples thereof include a (meth)acryl-based polymer obtained by copolymerizing 2-ethylhexyl acrylate as a (meth)acryl-based polymer having a carboxyl group, and acrylic acid. In this case, by adjusting acrylic acid at 3.7 parts by weight relative to a total of 100 parts by weight of 2-ethylhexyl acrylate and acrylic acid, the aforementioned acid value can be satisfied.

In the present invention, the hydroxyl group-containing monomer can be optionally used. Examples of the hydroxyl group-containing monomer include 2-hydroxyethyl(meth)acrylate, 2-hydroxypropyl(meth)acrylate, 4-hydroxybutyl(meth)acrylate, 6-hydroxyhexyl(meth)acrylate, 8-hydroxyoctyl(meth)acrylate, 10-hydroxydecyl(meth)acrylate, 12-hydroxylauryl(meth)acrylate, (4-hydroxymethylcyclohexyl)methyl acrylate, N-methylol(meth)acrylamide, vinyl alcohol, allyl alcohol, 2-hydroxyethyl vinyl ether, 4-hydroxybutylvinyl ether, and diethylene glycol monovinyl ether.

In the case where the aforementioned (meth)acryl-based monomer having a hydroxyl group is contained, a (meth)acryl-based monomer having a hydroxyl group is preferably 0.1 to 10 parts by weight, more preferably 0.5 to 8 parts by weight relative to 100 parts by weight of a whole constituent unit of a (meth)acryl-based polymer.

Furthermore, in the present invention, as an arbitrary component other than the aforementioned monomers, for example, as other polymerizable monomer component, a cohesive strength or a heat resistance improving component such as a sulfonic acid group-containing monomer, a phosphoric acid group-containing monomer, a cyano group-containing monomer, vinyl esters, and an aromatic vinyl compound, and a component having a functional group working for improving an adhesive strength or for a crosslinking point, such as an amido group-containing monomer, an amino group-containing monomer, an imido group-containing monomer, an epoxy group-containing monomer, (meth)acryloylmorpholine, vinyl ethers can be appropriately used. Other components may be used alone, or two or more of them may be used by mixing.

Examples of the cyano group-containing monomer include acrylonitrile and methacrylonitrile.

Examples of vinylesters include vinyl acetate, vinyl propionate, and vinyl laurate.

Examples of the aromatic vinyl compound include styrene, chlorostyrene, chloromethylstyrene, α-methylstyrene, and other substituted styrene.

Examples of the amido group-containing monomer include acrylamide, methacrylamide, diethylacrylamide, N-vinylpyrrolidone, N,N-dimethylacrylamide, N,N-dimethylmethacrylamide, N,N-diethylacrylamide, N,N-diethylmethacrylamide, N,N'-methylenebisacrylamide, N,N-dimethylaminopropylacrylamide, N,N-dimethylaminopropylmethacrylamide, and diacetoneacrylamide.

Examples of the amino group-containing monomer include aminoethyl(meth)acrylate, N,N-dimethylaminoethyl (meth)acrylate, and N,N-dimethylaminopropyl(meth)acrylate.

Examples of the imido group-containing monomer include cyclohexylmaleimide, isopropylmaleimide, N-cyclohexylmaleimide, and itaconeimide.

Examples of the epoxy group-containing monomer include glycidyl(meth)acrylate, methylglycidyl(meth)acrylate, and allyl glycidyl ether.

Examples of vinyl ethers include methyl vinyl ether, ethyl vinyl ether, and isobutyl vinyl ether.

The aforementioned other polymerizable monomer component may be used alone, or two or more kinds may be used by mixing, and a content as a whole is such that a polymerizable monomer component is preferably 0 to 40 parts by weight, more preferably 0 to 35 parts by weight, particularly preferably 0 to 30 parts by weight relative to 100 parts by weight of a total constituting unit of a (meth)acryl-based polymer. By using the aforementioned other polymerizable monomer component, better interaction with an alkali metal salt, and better adherability can be appropriately regulated.

The aforementioned (meth)acryl-based polymer used in the present invention has a weight average molecular weight of preferably 100,000 to 5,000,000, more preferably 200,000 to 4,000,000, further preferably 300,000 to 3,000,000. When a weight average molecular weight is less than 100,000, there is a tendency that paste (adhesive residue) remaining is generated due to reduction in a cohesive strength of a pressure-sensitive adhesive composition. On the other hand, when a weight average molecular weight exceeds 5,000,000, there is a tendency that fluidity of a polymer is reduced, wetting on a polarizing plate becomes insufficient. A weight average molecular weight is obtained by measurement with GPC (gel permeation chromatography).

In addition, for the reason that pressure-sensitive adhering performance is easily balanced, it is desirable that a glass transition temperature (Tg) of the (meth)acryl-based polymer is 0° C. or lower (usually −100° C. or higher), preferably −10° C. or lower. When a glass transition temperature is higher than 0° C., it becomes difficult to obtain a sufficient adhering property. In addition, a glass transition temperature (Tg) of a (meth)acryl-based polymer can be adjusted in the aforementioned range by appropriating changing a monomer component and a composition ratio to be used.

The (meth)acryl-based polymer of the present invention is obtained by a polymerization method which is generally used as a procedure for synthesizing a (meth)acryl-based polymer such as solution polymerization, emulsion polymerization, bulk polymerization, and suspension polymerization. In addition, the resulting polymer may be any of a random copolymer, a block copolymer, and a graft copolymer.

The ethylene oxide group-containing compound in the present invention is not particularly limited insofar as it is a compound having an ethylene oxide group, and a known ethylene oxide group-containing compound can be suitably used. Specific examples include nonionic surfactants such as polyoxyethylene alkyl amine, polyoxyethylene diamine, polyoxyethylene fatty ester, polyoxyethylene sorbitan fatty ester, polyoxyethylene alkyl phenyl ether, polyoxyethylene alkyl ether, polyoxyethylene alkyl allyl ether, and polyoxyethylene alkyl phenyl allyl ether, anionic surfactants such as polyoxyethylene alkyl ether sulfate, polyoxyethylene alkyl ether phosphate, polyoxyethylene alkyl phenyl ether sulfate, and polyoxyethylene alkyl phenyl ether phosphate, cationic surfactants and amphoteric surfactants having an ethylene oxide group, ethylene glycol group-containing (meth)acryl-based polymers, and ethylene oxide group-containing polyether esters. These compounds may be used alone, or two or more of them may be used by mixing. In addition, the ethylene oxide group-containing compound may have reactive substituents such as an acryloyl group, a methacryloyl group, and an allyl group in its molecule. Among the ethylene oxide group-containing compounds, ethylene oxide group-containing polyether esters and nonionic surfactants having an ethylene oxide group are preferable because of easy balance in compatibility with a base polymer.

Specific examples of the ethylene oxide group-containing polyether esters include, for example, polypropylene glycol/polyethylene glycol/polypropylene glycol block copolymers, polypropylene glycol/polyethylene glycol block copolymers, polyethylene glycol/polypropylene glycol/polyethylene glycol block copolymers, and polyethylene glycol/polypropylene glycol random copolymers and block copolymers. These compounds may be used alone, or two or more kinds may be used by mixing.

Specific examples of the nonionic surfactant having the ethylene oxide group include, for example, commercial products available under the trade names ADEKA REASOAP NE-10, ADEKA REASOAP ER-10 (all of which are manufactured by Asahi Denka Co., Ltd.), Latemul PD-420, Latemul PD-430, Emulgen 120, Emulgen A-90 (all of which are manufactured by Kao Corporation), Newcoal 1008 (manufactured by Nippon Nyukazai Co., Ltd.), Noigen XL-100 (manufactured by Dai-ichi Kogyo Seiyaku Co., Ltd.), etc. These compounds may be used alone, or two or more kinds may be used by mixing.

In addition, in the present invention, the content of the polyethylene oxide group in the ethylene oxide group-containing compound is preferably 5 to 85% by weight, more preferably 5 to 80% by weight, still more preferably 5 to 75% by weight. A content of the polyethylene oxide group outside of these ranges is not preferable because when the content is less than 5% by weight, the resulting pressure-sensitive adhesive composition may be poor in affinity with the alkali metal salt and inferior in an effect of preventing staining of a subject to be protected, while when the content is higher than 85% by weight, the composition may have high crystallinity to reduce compatibility with (meth)acryl-based polymers.

As a molecular weight of the aforementioned ethylene oxide group-containing compound, a number average molecular weight of 10,000 or less, preferably 200 to 5,000 is preferably used. When a number average molecular weight exceeds 10,000, there is a tendency that stain property onto an adherend is deteriorated. A number average molecular weight refers to a molecular weight obtained by measurement by GPC (gel permeation chromatography).

In addition, an amount of ethylene oxide group-containing compound to be blended is 0.01 to 40 parts by weight, preferably 0.05 to 30 part by weight, more preferably 0.1 to 20 part by weight relative to 100 parts by weight of a (meth)acryl-based polymer. When the amount is less than 0.01 part by weight, sufficient antistatic property is not obtained and, when the amount exceeds 40 parts by weight, there is a tendency that staining on an adherend (a subject to be protected) is increased.

Examples of an alkali metal salt used in the present invention include a metal salt comprising lithium, sodium, or potassium, and, specifically, a metal salt constructed of a cation consisting of $Li^+$, $Na^+$, or $K^+$, and an anion consisting of $Cl^-$, $Br^-$, $I^-$, $BF_4^-$, $PF_6^-$, $SCN^-$, $ClO_4^-$, $CF_3SO_3^-$, $(CF_3SO_2)_2N^-$, $(C_2F_5SO_2)_2N^-$, or $(CF_3SO_2)_3C^-$ is preferably used. Among them, a lithium salt such as $LiBr$, $LiI$, $LiBF_4$, $LiPF_6$, $LiSCN$, $LiClO_4$, $LiCF_3SO_3$, $Li(CF_3SO_2)_2N$, $Li(C_2F_5SO_2)_2N$, and $Li(CF_3SO_2)_3C$ is preferably used. These alkali metal salts may be used alone, or two or more kinds may be used by mixing.

Regarding a blending amount of an alkali metal salt used in the pressure-sensitive adhesive composition, an alkali metal salt is preferably blended at an amount of less than 1 part by weight, more preferably 0.01 to 0.8 parts by weight relative to 100 parts by weight of a (meth)acryl-based polymer, further preferably 0.01 to 0.5 parts by weight relative to 100 parts by weight of a (meth)acryl-based polymer. When a blending amount is less than 0.01 part by weight, sufficient antistatic property is not obtained in some cases. On the other hand, when a blending amount is more than 1 part by weight, there is a tendency that staining on an adherend (a subject to be protected) is increased, which is not preferable.

In the pressure-sensitive adhesive composition of the present invention, pressure-sensitive adhesive sheets further excellent in heat resistance are obtained by appropriately crosslinking a (meth)acryl-based polymer. Examples of a specific means for a crosslinking compounds include a crosslinking agent, in which a compound having a group reactive with a carboxyl group, a hydroxyl group which is appropriately contained as a crosslinking basal point in a (meth)acrly-based polymer such as an isocyanate compound, an epoxy compound, a melanine-based resin and an aziridine compound is added to react them. Among them, from a viewpoint mainly of obtaining an appropriate cohesive strength, an isocyanate compound and an epoxy compound are particularly preferably used. These compounds may be used alone, or two or more kinds may be used by mixing.

Examples of the isocyanate compound include lower aliphatic polyisocyanates such as butylene diisocyanate, and hexamethylene diisocyanate, alicyclic isocyanates such as cyclopentylene diisocyanate, cyclohexylene diisocyanate, and isophorone diisocyanate, aromatic diisocyanates such as 2,4-tolylene diisocyanate, 4,4'-diphenylmethane diisocyanate, and xylene diisocyanate, and isocyanate adducts such as trimethylolpropane/tolylene diisocyanate trimer adduct (trade name: Coronate L manufactured by Nippon Polyurethane Industry Co., Ltd.), trimethylolpropane/hexamethylene diisocyanate trimer adduct (trade name: Coronate HL manufactured by Nippon Polyurethane Industry Co., Ltd.), and isocyanurate entity of hexamethylene diisocyanate (trade name: Coronate HX manufactured by Nippon Polyurethane Industry Co., Ltd.). These isocyanate compounds may be used alone, or two or more kinds may be used by mixing.

Examples of the epoxy compound include N,N,N',N'-tetraglycidyl-m-xylenediamine (trade name TETRAD-X manufactured by Mitsubishi Gas Chemical Company, Inc.) and 1,3-bis(N,N-diglycidylaminomethyl)cyclohexane (trade name TETRAD-C manufactured by Mitsubishi Gas Chemical Company Inc.). These compounds may be used alone, or two or more kinds may be used by mixing.

Examples of the melamine-based resin include hexamethylolmelamine. These resins may be used alone, or two or more kinds may be used by mixing.

Examples of the aziridine derivative include trade name HDU, trade name TAZM, and trade name TAZO (all of which are manufactured by Sogo Pharmaceutical Co., Ltd.) as a commercially available product. These compounds may be used alone, or two or more kinds may be used by mixing.

Examples of the metal chelate compound include aluminum, iron, tin, titanium, nickel, and so on as metal components, and acetylene, methyl acetoacetic acid, ethyl lactic acid, and so on, as chelate components. These compounds may be used alone, or two or more kinds may be used by mixing.

An amount of these crosslinking agents to be used depends on balance between a (meth)acryl-based polymer to be crosslinked, and is appropriately selected depending on utility as a pressure-sensitive adhesive sheet. In order to obtain sufficient heat resistance due to a cohesive strength of an acryl pressure-sensitive adhesive, generally, the crosslinking agent is contained preferably at 0.01 to 15 parts by weight, more preferably 0.5 to 10 parts by weight relative to 100 parts by weight of the (meth)acryl-based polymer. When a content is less than 0.01 part by weight, crosslinking formation due to a crosslinking agent becomes insufficient, a cohesive strength of a pressure-sensitive adhesive composition becomes small, and sufficient heat resistance is not obtained in some cases, and there is a tendency that it becomes cause for an adhesive residue. On the other hand, when a content exceeds 15 parts by weight, a cohesive strength of a polymer is great, fluidity is reduced, and wetting on an adherend (a subject to be protected) becomes insufficient, and there is a tendency that this becomes cause for peeling off. These crosslinking agents may be used alone, or may be used by mixing two or more kinds.

Alternatively, a polyfunctional monomer containing two or more radiation-reactive unsaturated bonds as a substantial crosslinking agent is added, and this may be crosslinked with radiation.

As the polyfunctional monomer having two or more radiation-reactive unsaturated bonds, a polyfunctional monomer component having two or more of one kind or two or more kinds radiation-reactive groups which can be crosslinking-treated (cured) by irradiation of radiation, such as a vinyl group, an acryloyl group, a methacryloyl group, and a vinylbenzyl group is used. Generally, a component having 10 or less of radiation-reactive unsaturated bonds is suitably used. The polyfunctional monomers may be used alone, or two or more kinds may be used by mixing.

Examples of the polyfunctinal monomer include ethylene glycol di(meth)acrylate, diethlene glycol di(meth)acrylate, tetraethylene glycol di(meth)acrylate, neopentyl glycol di(meth)acrylate, 1,6-hexanediol di(meth)acrylate, trimethylolpropane tri(meth)acrylate, pentaerythritol tri(meth)acrylate, dipentaerythritol hexa(meth)acrylate, divinylbenzene, and N,N'-methylenebisacrylamide.

An amount of the polyfunctinoal monomer to be used depends on balance between a (meth)acryl-based polymer to be crosslinked, and is appropriately selected depending on utility as a pressure-sensitive adhesive sheet. In order to obtain sufficient heat resistance due to a cohesive strength of an acryl pressure-sensitive adhesive, generally, the monomer is preferably blended at 0.1 to 30 parts by weight relative to 100 parts by weight of a (meth)acryl-based polymer. From a viewpoint of flexibility and tackiness, the monomer is preferably blended at 10 parts by weight or less relative to 100 parts by weight of a (meth)acryl-based polymer.

Examples of radiation include ultraviolet ray, laser ray, α ray, β ray, γ ray, X-ray, and electron beam. From a viewpoint of controlling property and better handling property and a cost, ultraviolet ray is suitably used. More preferably, ultraviolet ray having a wavelength of 200 to 400 nm is used. Ultraviolet ray can be irradiated using an appropriate light source such as a high pressure mercury lamp, a micro-wave excitation-type lamp, and a chemical lamp. When ultraviolet ray is used as irradiation, a photopolymerization initiator is added to an acryl pressure-sensitive adhesive layer.

The photopolymerization initiator depends on a kind of a radiation-reactive component, and may be a substance which produces a radical or a cation by irradiating ultraviolet ray having an appropriately wavelength which can trigger the polymerization reaction.

Example of the photoradical polymerization initiator include benzoins such as benzoin, benzoin methyl ether, benzoin ethyl ether, methyl o-benzoylbenzoate-p-benzoin ethyl ether, benzoin isopropyl ether, and α-methylbenzoin, acetophenes such as benzyldimethylketal, trichloroacetophenone, 2,2-diethoxyacetophenone, and 1-hydroxycyclohexyl phenyl ketone, propiophenones such as 2-hydroxy-2-methylpropiophenone, and 2-hydroxy-4'-isopropyl-2-methylpropiophenone, benzophenones such as benzophenone, methylbenzophenone, p-chlorobenzophenone, and p-dimethylaminobenzophenone, thioxanthons such as 2-chlorothioxanthon, 2-ethylthioxanthon, and 2-isopropylthioxanthon, acylphosphine oxides such as bis(2,4,6-trimethylbenzoyl)-phenylphosphine oxide, 2,4,6-trimethylbenzoyl-diphenylphosphine oxide, and (2,4,6-trimethylbenzoyl)-(ethoxy)-phenylphosphine oxide, benzil, dibenzsuberone, and α-acyloxime ether. These initiators may be used alone, or two or more kinds may be used by mixing.

Examples of a photocation polymerization initiator include onium salts such as an aromatic diazonium salt, an aromatic iodonium salt, and an aromatic sulfonium salt, organometallic complexes such as an ion-allene complex, a titanocene complex, and an aryl silanol-aluminum complex, nitrobenzyl ester, sulfonic acid derivative, phosphoric acid ester, phenolsulfonic acid ester, diazonaphthoquinone, and N-hydroxyimidosulfonate. The photopolymerization initiators may be used alone, or two or more kinds may be used by mixing.

It is preferably that the photopolymerization initiator is blended usually in a range of 0.1 to 10 parts by weight, preferably 0.2 to 7 parts by weight relative to 100 parts by weight of a (meth)acryl-based polymer.

In addition, it is also possible to use a photoinitiation polymerization assistant such as amines. Examples of the photoinitiation assistant include 2-dimethylaminoethyl benzoate, dimethylaminoacetophenone, p-dimethylaminobenzoic acid ethyl ester, and p-dimethylaminobenzoic acid isoamyl ester. Two or more kinds of the photopolymerization initiation assistants may be used. It is preferably that the polymerization initiation assistant is blended at 0.05 to 10 parts by weight, further 0.1 to 7 parts by weight relative to 100 parts by weight a (meth)acryl-based polymer.

Furthermore, the previously known tackifiers, or the previously known various additives such as a colorant, a surfactant, an elasticizer, low molecular polymer, a surface lubricant agent, a leveling agent, an antioxidant, a corrosion preventing agent, a photo stabilizer, an ultraviolet absorbing agent, a polymerization inhibitor, a silane coupling agent, and a powder, a particle, inorganic or organic filer, metal powder, a foil, and pigment may be appropriately added to the pressure-sensitive adhesive composition used in the pressure-sensitive adhesive sheet of the present invention depending on utility.

Meanwhile, the pressure-sensitive adhesive layer in the present invention is such that the aforementioned pressure-sensitive adhesive composition is crosslinked. In addition, pressure-sensitive adhesive sheets of the present invention are such that such the pressure-sensitive adhesive layer is formed on a supporting film (a support). Thereupon, crosslinking of the pressure-sensitive adhesive composition is generally performed after coating of the pressure-sensitive adhesive composition, and a pressure-sensitive adhesive layer composition after crosslinking may be also transferred onto a supporting film.

When a photopolymerization initiator as an arbitrary component is added as described above, a pressure-sensitive adhesive layer can be obtained by coating the pressure-sensitive adhesive composition directly on a subject to be protected, or coating on one side or both sides of a supporting substrate, and performing light irradiation. Usually, a pressure-sensitive adhesive layer is used by photopolymerization by irradiating with ultraviolet ray having an irradiance of 1 to 200 mW/cm$^2$ at a wavelength of 300 to 400 nm, at an exposure dose of around 200 to 4000 mJ/cm$^2$.

A method of forming a pressure-sensitive adhesive layer on a film is not particularly limited, but for example, a layer is prepared by coating the aforementioned pressure-sensitive adhesive composition on a supporting film, and drying this to remove a polymerization solvent to form a pressure-sensitive adhesive layer on a supporting film. Thereafter, aging may be performed for the purpose of adjusting transference of a component of a pressure-sensitive adhesive layer or adjusting a crosslinking reaction. Alternatively, when pressure-sensitive adhesive sheets are prepared by coating a pressure-sensitive adhesive composition on a supporting film, one or more kinds of solvents other than a polymerization solvent may be newly added to the composition so that the composition can be uniformly coated on a supporting film.

In addition, as a method of forming the pressure-sensitive adhesive layer of the present invention, the known method used for preparing pressure-sensitive adhesive sheets is used. Specifically, examples include roll coating, gravure coating, reverse coating, roll brushing, spray coating, and air knife coating methods, immersing and curtain coating method, and extruding coating method with a die coater.

Pressure-sensitive adhesive sheets of the present invention are such that the aforementioned pressure-sensitive adhesive layer is coated on one side or both sides of various supports comprising a plastic film such as a polyester film, or a porous material such as a paper and a non-woven fabric at a thickness of usually 3 to 100 μm, preferably around 5 to 50 μm, to form an aspect of a sheet or a tape.

A thickness of the film of the present pressure-sensitive adhesive sheets is usually 5 to 200 μm, preferably around 10 to 100 μm.

The support film (support) may be subjected to releasing, anti-staining with silicone, fluorine, long chain alkyl-based or fatty acid amide-based releasing agent, or a silica powder, easy adhesion treatment such as acid treatment, alkali treatment, primer treatment, corona treatment, plasma treatment, and ultraviolet ray treatment, or coating-type, kneading-type, or deposition-type antistatic treatment, if necessary.

In addition, the support film (support) constituting a surface protecting film is preferably a resin film (plastic substrate) having heat resistance and solvent resistance and, at the same time, having flexibility. By the support film having flexibility, a pressure-sensitive adhesive composition can be coated by a roll coater etc., and can be wound in a roll-like.

The aforementioned plastic substrate is not particularly limited as far as it can be formed into a sheet or a film, and examples include a polyolefin film such as polyethylene, polypropylene, poly-1-butene, poly-4-methyl-1-pentene, a polybutadiene film, a polymethylpentene film, an ethylene-propylene copolymer, an ethylene-1-butene copolymer, an ethylene-vinyl acetate copolymer, an ethylene-ethyl acrylate copolymer, and an ethylene-vinyl alcohol copolymer, a polyester film such as polyethylene terephthalate, polyethylene naphthalate, and polybutylene terephthalate, a polyacrylate film, a polyurethane film, a polystyrene film, a polyamide film such as nylon 6, nylon 6,6, and partially aromatic polyamide, a polyvinyl chloride film, a vinyl chloride copolymer film, a polyvinylidene chloride film, and a polycarbonate film.

In addition, in the present invention, it is more preferably that a plastic substrate used in the surface protecting film of the present invention is electrification preventing-treated.

Antistatic treatment which is performed on a plastic substrate is not particularly limited, but for example, a method of providing an electrification preventing layer on at least one side of a generally used film, or a method of kneading a kneading-type electrification preventing agent into a plastic film is used. Examples of a method of providing an electrification preventing layer on at least one side of a substrate include a method of coating an electrification preventing resin comprising an electrification preventing agent and a resin component, or an electrically conductive resin containing an electrically conductive polymer or an electrically conductive substance, and a method of depositing or plating an electrically conductive substance.

Examples of an electrification preventing agent contained in an electrification preventing resin include a cation-type electrification preventing agent having a cationic functional group such as a quaternary ammonium salt, a pyridinium salt, and a primary, secondary or tertiary amino group, an anion-type electrification preventing agent having an anionic functional group such as a sulfonic acid salt, a sulfuric acid ester salt, a phosphonic acid salt, and a phosphoric ester salt, an amphoteric-type electrification preventing agent such as alkylbetain and a derivative thereof, imidazoline and a derivative thereof, and alanine and a derivative thereof, a nonion-type electrification preventing agent such as glycerin and a derivative thereof, and polyethylene glycol and a derivative thereof, and an ionic electrically conductive polymer obtained by polymerizing or copolymerizing a monomer having the aforementioned cation-type, anion-type, or amphoteric-type ionic electrically conductive group. These compounds may be used alone, or two or more of them may be used by mixing.

Specifically, examples of the cation-type electrification preventing agent include a (meth)acrylate copolymer having a quaternary ammonium group such as an alkyl trimethylammonium salt, acyloylamidopropyltrimethtylammonium methosulfate, an alkylbenzylmethylammonium salt, acyl choline chloride, and polydimethylaminoethyl methacrylate, a styrene copolymer having a quaternary ammonium group such as polyvinylbenzyltrimethylammonium chloride, and a diallylamine copolymer having a quaternary ammonium group such as polydiallyldimethylammonium chloride. The compounds may be used alone, or two or more kinds may be used by mixing.

Examples of the anion-type electrification preventing agent include an alkyl sulfonic acid salt, an alkylbenzenesulfonic acid salt, an alkyl sulfate ester salt, an alkyl ethoxy sulfate ester salt, an alkyl phosphate ester salt, and a sulfonic acid group-containing styrene copolymer. These compounds may be used alone, or two or more kinds may be used by mixing.

Examples of the amphoteric-type electrification preventing agent include alkylbetain, alkylimidazoliumbetain, and carbobetaingrafted copolymer. These compounds may be used alone, or two or more kinds may be used by mixing.

Examples of the nonion-type electrification preventing agent include fatty acid alkylolamide, di(2-hydroxyethyl) alkylamine, polyoxyethylenealkylamine, fatty acid glycerin ester, polyoxyethylene glycol fatty acid ester, sorbitan fatty acid ester, polyoxysorbitan fatty acid ester, polyoxyethylene alkyl phenyl ether, polyoxyethylene alkyl ether, polyethylene glycol, polyoxyethylenediamine, a copolymer consisting of polyether, polyester and polyamide, and methoxypolyethyleneglycol (meth)acrylate. These compounds may be used alone, or two or more kinds may be used by mixing.

Examples of the electrically conductive polymer include polyaniline, polypyrrole and polythiophene. These electrically conductive polymers may be used alone, or two or more kinds may be used by mixing.

Examples of the electrically conductive substance include tin oxide, antimony oxide, indium oxide, cadmium oxide, titanium oxide, zinc oxide, indium, tin, antimony, gold, silver, copper, aluminum, nickel, chromium, titanium, iron, covert, copper iodide, and an alloy and a mixture thereof. These electrically conductive substances may be used alone, or two or more kinds may be used by mixing.

As a resin component used in the electrification preventing resin and the electrically conductive resin, a generally used resin such as polyester, acryl, polyvinyl, urethane, melamine and epoxy is used. In the case of a polymer-type electrification preventing agent, it is not necessary that a resin component is contained. In addition, the electrification preventing resin component may contain compounds of a methylolated or alkylolated melamine series, a urea series, a glyoxal series, and an acrylamide series, an epoxy compound, or an isocyanate compound as a crosslinking agent.

An electrification preventing layer is formed, for example, by diluting the aforementioned electrification preventing resin, electrically conductive polymer or electrically conductive resin with a solvent such as an organic solvent and water, and coating this coating solution on a plastic film, followed by drying.

Examples of an organic solvent used in formation of the electrification preventing layer include methyl ethyl ketone, acetone, ethyl acetate, tetrahydrofuran, dioxane, cyclohexanone, n-hexane, toluene, xylene, methanol, ethanol, n-propanol and isopropanol. These solvents may be used alone, or two or more kinds may be used by mixing.

As a coating method in formation of the electrification preventing layer, the known coating method is appropriately used, and examples include roll coating, gravure coating, reverse coating, roll brushing, spray coating, and air knife coating methods, an immersing and curtain coating method, and an extrusion coating method with a die coater.

A thickness of the aforementioned electrification preventing resin layer, electrically conductive polymer or electrically conductive resin is usually 0.01 to 5 μm, preferably around 0.03 to 1 μm.

Examples of a method of depositing or plating an electrically conductive substance include vacuum deposition, sputtering, ion plating, chemical deposition, spray pyrolysis, chemical plating, and electric plating methods.

A thickness of the electrically conductive substance is usually 20 to 10,000 Å, preferably 50 to 5,000 Å.

As the kneading-type electrification preventing agent, the aforementioned electrification preventing agent is appropriately used.

An amount of the kneading-type electrification preventing agent to be blended is 20% by weight or less, preferably in a range of 0.05 to 10% by weight relative to a total weight of a plastic film. A kneading method is not particularly limited as far as it is a method by which the electrification preventing agent can be uniformly mixed into a resin used in a plastic film, but for example, a heating roll, a Banbury mixer, a pressure kneader, and a biaxial kneading machine are used.

If necessary, a separator (or peeling liner, peeling sheet etc.) can be laminated on a surface of a pressure-sensitive adhesive for the purpose of protecting a pressure-sensitive adhesive surface.

The material constituting the separator includes paper and a plastic film, and the plastic film is preferably used because it is excellent in surface smoothness. The film is not particularly limited insofar as it can protect the pressure-sensitive adhesive layer, and examples thereof include a polyethylene film, polypropylene film, polybutene film, polybutadiene film, polymethyl pentene film, polyvinyl chloride film, vinyl chloride copolymer film, polyethylene terephthalate film, polybutylene terephthalate film, polyurethane film, and ethylene/vinyl acetate copolymer film.

A thickness of the separator (separator film) is usually around 5 to 2001 μm, preferably around 10 to 100 μm.

The separator (separator film) may be subjected to releasing, anti-staining with silicone, fluorine, long chain alkyl-based or fatty acid amide-based releasing agent, or a silica powder, or coating-type, kneading-type, or deposition-type antistatic treatment, if necessary.

The pressure-sensitive adhesive composition, the pressure-sensitive adhesive layer, and the pressure-sensitive adhesive sheets and surface protecting films using the present invention are used, particularly, in plastic products on which static electricity is easily generated. For this reason, in particular, those films are very useful as an antistatic surface protecting film in the technical field associated with an electron appliances in which electrification of static electricity and staining are a particularly serious problem.

EXAMPLES

Examples which specifically show a construction and effect of the present invention will be explained below. Assessment items in Examples were measured as follows:
<Measurement of Acid Value>
An acid value was measured using an automatically titrating apparatus (COM-550 manufactured by HIRANUMA SANGYO Co., Ltd.), and was obtained by the following equation.

$$A=\{(Y-X) \times f \times 5.611\}/M$$

A; Acid value
Y; Titration amount of sample solution (ml)
X; Titration amount of solution of only 50 g of mixed solvent (ml)
f; Factor of titration solution
M; Weight of polymer sample (g)
Measurement conditions are as follows:
Sample solution: About 0.5 g of a polymer sample was dissolved in 50 g of a mixed solvent (toluene/2-propanol/distilled water=50/49.5/0.5, weight ratio) to obtain a sample solution.
Titration solution: 0.1N 2-propanolic potassium hydroxide solution (for petroleum product neutralization value test manufactured by Wako Pure Chemical Industries, Ltd.)
Electrode: glass electrode; GE-101, comparative electrode; RE-201, Measurement mode: petroleum product neutralization value test 1
<Measurement of Molecular Weight>
A molecular weight was measured using a GPC apparatus (HLC-8220GPC manufactured by Tosoh Corporation). Measuring conditions are as follows.
Sample concentration: 0.2 wt % (THF solution)
Sample injection amount: 10 μl
Eluent: THF
Flow rate: 0.6 ml/min
Measuring temperature: 40° C.
Column:
Sample column; TSKguard column SuperHZ-H(1 column)+TSK gel Super HZM-H(2 columns)
Reference column; TSK gel SuperH-RC(1 column)
Detector: Refractive index detector (RI)
A molecular weight was obtained in terms of polystyrene.
<Measurement of Glass Transition Temperature Tg>
A glass transition temperature Tg(° C.) was obtained by the following equation using the following reference values as a glass transition temperature $Tg_n$(° C.) of a homopolymer of each monomer.

Equation:

$$1/(Tg+273)=\Sigma[W_n/(Tg_n+273)]$$

[wherein Tg (° C.) represents a glass transition temperature of a copolymer, $W_n$ (–) represents a weight fraction of each monomer, $Tg_n$ (° C.) represents a glass transition temperature of a homopolymer of each monomer, and n represents a kind of each monomer]
Reference values:
2-Ethylhexyl acrylate:–70° C.
2-Hydroxyethyl acrylate:–15° C.
<Preparation of (Meth)Acryl-based Polymer>
[Acryl-based Polymer (A)]
A four-neck flask equipped with a stirring wing, a thermometer, a nitrogen gas introducing tube, and a condenser was charged with 200 parts by weight of 2-ethylhexyl acrylate, 8 parts by weight of 2-hydroxyethyl acrylate, 0.4 part by weight of 2,2'-azobisisobutyronitrile as a polymerization initiator, and 312 parts by weight of ethyl acetate, a nitrogen gas was introduced while mildly stirring, and a polymerization reaction was performed for about 6 hours while maintaining a liquid temperature in a flask at around 65° C. to prepare an acryl-based polymer (A) solution (40% by weight). A weight average molecular weight of the acryl-based polymer (A) was 540,000, a glass transition temperature (Tg) was –68° C., and an acid value was 0.0.
<Preparation of Antistatic Agent>
[Antistatic Agent Solution (a)]
A four-neck flask equipped with a stirring wing, a thermometer, and a condenser was charged with 0.5 part by weight of lithium iodide, 49.5 parts by weight of polypropylene glycol/polyethylene glycol/polypropylene glycol copolymer (number average molecular weight 2000, ethylene oxide group content: 50% by weight), and 200 parts by weight of ethyl acetate, a nitrogen gas was introduced while mildly stirring, and mixing and stirring were performed for about 2 hours while maintaining a liquid temperature in a flask at around 80° C., to prepare an antistatic agent solution (a) (20% by weight).
[Antistatic Agent Solution (b)]
A four-neck flask equipped with a stirring wing, a thermometer, and a condenser was charged with 1 part by weight of $LiN(C_2F_5SO_2)_2$, 12.5 parts by weight of a polypropylene glycol/polyethylene glycol/polypropylene glycol copolymer (number average molecular weight 2000, ethylene oxide group content: 50% by weight), and 54 parts by weight of ethyl acetate, a nitrogen gas was introduced while mildly stirring, and mixing and stirring were performed for about 2 hours while maintaining a liquid temperature in a flask at around 80° C., to prepare an antistatic agent solution (b) (20% by weight).
[Antistatic Agent Solution (c)]
A four-neck flask equipped with a stirring wing, a thermometer, and a condenser was charged with 1 part by weight of lithium iodide, 49.5 parts by weight of polypropylene glycol/polyethylene glycol/polypropylene glycol copolymer (number average molecular weight 2700, ethylene oxide group content: 40% by weight), and 202 parts by weight of ethyl acetate, a nitrogen gas was introduced while mildly stirring, and mixing and stirring were performed for about 2 hours while maintaining a liquid temperature in a flask at around 80° C., to prepare an antistatic agent solution (c) (20% by weight).
[Antistatic Agent Solution (d)]
A four-neck flask equipped with a stirring wing, a thermometer, and a condenser was charged with 1 part by weight of lithium iodide, 49 parts by weight of polypropylene glycol/ polyethylene glycol/polypropylene glycol copolymer (number average molecular weight 3300, ethylene oxide group content: 10% by weight), and 200 parts by weight of ethyl acetate, a nitrogen gas was introduced while mildly stirring, and mixing and stirring were performed for about 2 hours while maintaining a liquid temperature in a flask at around 80° C., to prepare an antistatic agent solution (d) (20% by weight).

[Antistatic Agent Solution (e)]

A four-neck flask equipped with a stirring wing, a thermometer, and a condenser was charged with 0.5 part by weight of lithium iodide, 49.5 parts by weight of polypropylene glycol (diol type, number average molecular weight 2000, ethylene oxide group content: 0% by weight), and 200 parts by weight of ethyl acetate, a nitrogen gas was introduced while mildly stirring, and mixing and stirring were performed for about 2 hours while maintaining a liquid temperature in a flask at around 80° C., to prepare an antistatic agent solution (e) (20% by weight).

[Antistatic Agent Solution (f)]

A four-neck flask equipped with a stirring wing, a thermometer, and a condenser was charged with 5 parts by weight of lithium iodide, 45 parts by weight of polypropylene glycol/polyethylene glycol/polypropylene glycol copolymer (number average molecular weight 2000, ethylene oxide group content: 50% by weight), and 200 parts by weight of ethyl acetate, a nitrogen gas was introduced while mildly stirring, and mixing and stirring were performed for about 2 hours while maintaining a liquid temperature in a flask at around 80° C., to prepare an antistatic agent solution (f) (20% by weight).

[Antistatic Agent Solution (g)]

A four-neck flask equipped with a stirring wing, a thermometer, and a condenser was charged with 1 part by weight of lithium iodide, 49 parts by weight of nonionic reactive surfactant (ADEKA REASOAP ER-10 manufactured by Asahi Denka Co,. Ltd.), and 200 parts by weight of ethyl acetate, a nitrogen gas was introduced while mildly stirring, and mixing and stirring were performed for about 2 hours while maintaining a liquid temperature in a flask at around 80° C., to prepare an antistatic agent solution (g) (20% by weight).

<Preparation of Antistatic-treated Polyethylene Terephthalate Film>

10 parts by weight of an antistatic agent (Microsolver RMd-142 manufactured by SOLVEX CO., LTD., main component: tin oxide and polyester resin) was diluted with a mixed solvent consisting of 30 parts by weight of water and 70 parts by weight of methanol to prepare an antistatic agent solution.

The resulting antistatic agent solution was coated on a polyethylene terephthalate (PET) film (thickness 38 μm) using a Meyer-bar, and this was dried at 130° C. for 1 minute to remove a solvent to form an antistatic layer (thickness 0.2 μm), thereby, an antistatic-treated polyethylene terephthalate film was prepared.

Example 1

[Preparation of Pressure-sensitive Adhesive Solution]

The acryl-based polymer (A) solution (40% by weight) was diluted with ethyl acetate to 20% by weight, to 100 parts by weight of this solution were added 10 parts by weight of the antistatic agent solution (a) (20% by weight), 0.4 part by weight of an isocyanurate of hexamethylene isocyanate (Coronate HX manufactured by Nippon Polyurethane Industry Co., Ltd., 100% by weight) as a crosslinking agent, and 0.4 part by weight of dibutyltin dilaurate (1% by weight ethyl acetate solution) as a crosslinking catalyst, and mixing and stirring were performed to prepare an acryl-based pressure-sensitive adhesive solution (1). In the acryl-based pressure-sensitive adhesive solution (1), a blending amount of an alkali metal salt (lithium salt) was 0.1 part by weight relative to 100 parts by weight of an acryl-based polymer.

[Preparation of Pressure-sensitive Adhesive Sheet]

The acryl-based pressure-sensitive adhesive solution (1) was coated on a side opposite to an antistatic-treated side of the antistatic-treated polyethylene terephthalate film prepared as described above, and this was heated at 110° C. for 3 minutes to form a pressure-sensitive adhesive layer having a thickness of 20 μm. Then, a silicone-treated side of a polyethylene terephthalate film (thickness 25 μm) having a silicone-treated one side was laminated on a surface of the pressure-sensitive adhesive layer to prepare a pressure-sensitive adhesive sheet.

Example 2

[Preparation of Pressure-sensitive Adhesive Solution]

The acryl-based polymer (A) solution (40% by weight) was diluted with ethyl acetate to 20% by weight, to 100 parts by weight of this solution were added 2.7 parts by weight of the antistatic agent solution (b) (20% by weight), 0.5 part by weight of an isocyanurate of hexamethylene isocyanate (Coronate HX manufactured by Nippon Polyurethane Industry Co., Ltd., 100% by weight) as a crosslinking agent, and 0.4 part by weight of dibutyltin dilaurate (1% by weight ethyl acetate solution) as a crosslinking catalyst, and mixing and stirring were performed to prepare an acryl-based pressure-sensitive adhesive solution (2). In the acryl-based pressure-sensitive adhesive solution (2), a blending amount of an alkali metal salt (lithium salt) was 0.2 part by weight relative to 100 parts by weight of an acryl-based polymer.

[Preparation of Pressure-sensitive Adhesive Sheet]

According to the same manner as that of Example 1 except that the acryl-based pressure-sensitive adhesive solution (2) was used in place of the acryl-based pressure-sensitive adhesive solution (1), a pressure-sensitive adhesive sheet was prepared.

Example 3

[Preparation of Pressure-sensitive Adhesive Solution]

The acryl-based polymer (A) solution (40% by weight) was diluted with ethyl acetate to 20% by weight, to 100 parts by weight of this solution were added 3 parts by weight of the antistatic agent solution (c) (20% by weight), 0.6 part by weight of an isocyanurate of hexamethylene isocyanate (Coronate HX manufactured by Nippon Polyurethane Industry Co., Ltd., 100% by weight) as a crosslinking agent, and 0.4 part by weight of dibutyltin dilaurate (1% by weight ethyl acetate solution) as a crosslinking catalyst, and mixing and stirring were performed to prepare an acryl-based pressure-sensitive adhesive solution (3). In the acryl-based pressure-sensitive adhesive solution (3), a blending amount of an alkali metal salt (lithium salt) was 0.06 part by weight relative to 100 parts by weight of an acryl-based polymer.

[Preparation of Pressure-sensitive Adhesive Sheet]

According to the same manner as that of Example 1 except that the acryl-based pressure-sensitive adhesive solution (3) was used in place of the acryl-based pressure-sensitive adhesive solution (1), a pressure-sensitive adhesive sheet was prepared.

Example 4

[Preparation of Pressure-sensitive Adhesive Solution]

The acryl-based polymer (A) solution (40% by weight) was diluted with ethyl acetate to 20% by weight, to 100 parts by weight of this solution were added 5 parts by weight of the antistatic agent solution (d) (20% by weight), 0.5 part by weight of a trimethylolpropane/tolylene diisocyanate trimer adduct (Coronate L manufactured by Nippon Polyurethane Industry Co., Ltd., 75% by weight ethyl acetate solution) as a crosslinking agent, and 0.6 part by weight of dibutyltin dilaurate (1% by weight ethyl acetate solution) as a crosslinking catalyst, and mixing and stirring were performed to prepare an acryl-based pressure-sensitive adhesive solution (4). In the acryl-based pressure-sensitive adhesive solution (4), a blending amount of an alkali metal salt (lithium salt) was 0.1 part by weight relative to 100 parts by weight of an acryl-based polymer.

[Preparation of Pressure-sensitive Adhesive Sheet]

According to the same manner as that of Example 1 except that the acryl-based pressure-sensitive adhesive solution (4) was used in place of the acryl-based pressure-sensitive adhesive solution (1), a pressure-sensitive adhesive sheet was prepared.

Comparative Example 1

[Preparation of Pressure-sensitive Adhesive Solution]

An acryl-based pressure-sensitive adhesive solution (5) was prepared in the same manner as in Example 1, except that the aforementioned antistatic agent solution (a) was not used.

[Preparation of Pressure-sensitive Adhesive Sheet]

According to the same manner as that of Example 1 except that the acryl-based pressure-sensitive adhesive solution (5) was used in place of the acryl-based pressure-sensitive adhesive solution (1), a pressure-sensitive adhesive sheet was prepared.

Comparative Example 2

[Preparation of Pressure-sensitive Adhesive Solution]

The acryl-based polymer (A) solution (40% by weight) was diluted with ethyl acetate to 20% by weight, to 100 parts by weight of this solution were added 10 parts by weight of the antistatic agent solution (e) (20% by weight), 0.5 part by weight of a trimethylolpropane/tolylene diisocyanate trimer adduct (Coronate L manufactured by Nippon Polyurethane Industry Co., Ltd., 75% by weight ethyl acetate solution) as a crosslinking agent, and 0.6 part by weight of dibutyltin dilaurate (1% by weight ethyl acetate solution) as a crosslinking catalyst, and mixing and stirring were performed to prepare an acryl-based pressure-sensitive adhesive solution (6). In the acryl-based pressure-sensitive adhesive solution (6), a blending amount of an alkali metal salt (lithium salt) was 0.1 part by weight relative to 100 parts by weight of an acryl-based polymer.

[Preparation of Pressure-sensitive Adhesive Sheet]

According to the same manner as that of Example 1 except that the acryl-based pressure-sensitive adhesive solution (6) was used in place of the acryl-based pressure-sensitive adhesive solution (1), a pressure-sensitive adhesive sheet was prepared.

Comparative Example 3

[Preparation of Pressure-sensitive Adhesive Solution]

The acryl-based polymer (A) solution (40% by weight) was diluted with ethyl acetate to 20% by weight, to 100 parts by weight of this solution were added 2.0 parts by weight of an anionic surfactant, a sodium salt of dialkyl sulfo succinate (NEOCOL P manufactured by DAI-ICHI kogyo seiyaku CO., Ltd.), 1 part by weight of a trimethylolpropane/tolylene diisocyanate trimer adduct (Coronate L manufactured by Nippon Polyurethane Industry Co., Ltd, 75% by weight ethyl acetate solution) as a crosslinking agent, and 0.6 part by weight of dibutyltin dilaurate (1% by weight ethyl acetate solution) as a crosslinking catalyst, and mixing and stirring were performed to prepare an acryl-based pressure-sensitive adhesive solution (7).

[Preparation of Pressure-sensitive Adhesive Sheet]

According to the same manner as that of Example 1 except that the acryl-based pressure-sensitive adhesive solution (7) was used in place of the acryl-based pressure-sensitive adhesive solution (1), a pressure-sensitive adhesive sheet was prepared.

Comparative Example 4

[Preparation of Pressure-sensitive Adhesive Solution]

The acryl-based polymer (A) solution (40% by weight) was diluted with ethyl acetate to 20% by weight, to 100 parts by weight of this solution were added 10 parts by weight of the antistatic agent solution (f) (20% by weight), 0.4 part by weight of an isocyanurate of hexamethylene diisocyanate (Coronate HX manufactured by Nippon Polyurethane Industry Co., Ltd., 100% by weight) as a crosslinking agent, and 0.4 part by weight of dibutyltin dilaurate (1% by weight ethyl acetate solution) as a crosslinking catalyst, and mixing and stirring were performed to prepare an acryl-based pressure-sensitive adhesive solution (8). In the acryl-based pressure-sensitive adhesive solution (8), a blending amount of an alkali metal salt (lithium salt) was 1 part by weight relative to 100 parts by weight of an acryl-based polymer.

[Preparation of Pressure-sensitive Adhesive Sheet]

According to the same manner as that of Example 1 except that the acryl-based pressure-sensitive adhesive solution (8) was used in place of the acryl-based pressure-sensitive adhesive solution (1), a pressure-sensitive adhesive sheet was prepared.

Example 5

[Preparation of Pressure-sensitive Adhesive Solution]

The acryl-based polymer (A) solution (40% by weight) was diluted with ethyl acetate to 20% by weight, to 100 parts by weight of this solution were added 5.0 parts by weight of the antistatic agent solution (g) (20% by weight), 0.4 part by weight of an isocyanurate of hexamethylene diisocyanate (Coronate HX manufactured by Nippon Polyurethane Industry Co., Ltd., 100% by weight) as a crosslinking agent, and 0.4 part by weight of dibutyltin dilaurate (1% by weight ethyl acetate solution) as a crosslinking catalyst, and mixing and stirring were performed to prepare an acryl-based pressure-sensitive adhesive solution (9). In the acryl-based pressure-sensitive adhesive solution (9), a blending amount of an alkali metal salt (lithium salt) was 0.1 part by weight relative to 100 parts by weight of an acryl-based polymer.

[Preparation of Pressure-sensitive Adhesive Sheet]

According to the same manner as that of Example 1 except that the acryl-based pressure-sensitive adhesive solution (9)

was used in place of the acryl-based pressure-sensitive adhesive solution (1), a pressure-sensitive adhesive sheet was prepared.

Regarding pressure-sensitive adhesive sheets obtained in the aforementioned Examples and comparative Examples, a peeling electrification voltage, assessment of staining property (staining), and an adhesive strength were assessed by the following conditions.

<Measurement of Peeling Electrification Voltage>

A pressure-sensitive adhesive sheet was cut into a size of a width of 70 mm and a length of 130 mm, a separator was peeled, and this was adhered to a surface of a polarizing plate (SEG1425EWVAGS2B manufactured by Nitto Denko Corporation, width: 70 mm, length: 100 mm) laminated to an acryl plate (Acrylite manufactured by Mitsubishi Rayon Co., Ltd, thickness: 1 mm, width: 70 mm, length: 100 mm) from which electricity had been removed in advance, with a hand roller, so that one end was protruded by 30 mm.

Figure 1:
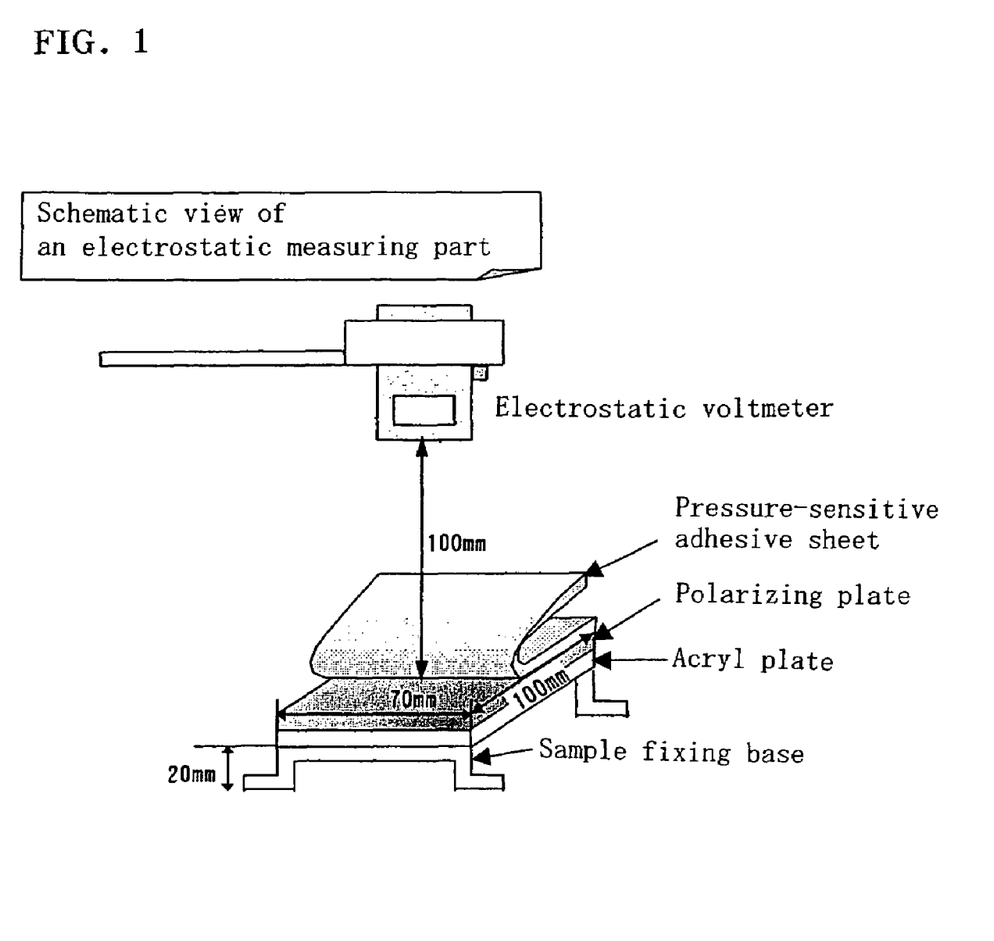
FIG. 1 is a schematic construction view of an electrostatic measuring part used for measuring a peeling electrification voltage in Examples.

After allowed to stand for one day under the environment of 23° C.×50% RH, and a sample was set at a prescribed position as shown in FIG. 1. One end protruding by 30 mm was fixed on an automatic winding machine, and a sample was peeled at a peeling angle of 150° and a peeling rate of 10 m/min. A voltage at a polarizing plate surface generated thereupon was measured with an electrostatic voltmeter (KSD-0103 manufactured by Kasuga Denki, INC.) fixed at the center position of the polarizing plate. Measurement was performed under the environment of 23° C.×50% RH.

<Assessment of Staining on an Adherend (A Subject to be Protected)>

A triacetylcellulose film (FujiTAC manufactured by Fuji Photo Film Co., Ltd.) having a thickness of 90 μm was cut into a size of a width of 70 mm and a length of 100 mm, and this was immersed in an aqueous sodium hydroxide solution (10% by weight) at 60° C. for 1 minute, and washed with distilled water to prepare an adherend.

The prepared pressure-sensitive adhesive sheet was cut into a size of a width of 50 mm and a length of 80 mm, and after the separator was peeled off, the pressure-sensitive adhesive sheet was laminated at a pressure of 0.25 MPa on the aforementioned adherend (previously washed with distilled water and left for one day in an environment of 23° C.×50% RH) to prepare an evaluation sample.

The evaluation sample was left for one day under the environment of 23° C.×50% RH, and the pressure-sensitive adhesive sheet was peeled off from the adherend by hands, and the state of staining on the surface of the adherend was observed with naked eyes. The evaluation criteria are as follows.

Case of observation of no staining: ○
Case of observation of staining: ×

<Measurement of an Adhesive Strength of Pressure-sensitive Adhesive Sheet>

A triacetylcellulose film (Fuji TAC manufactured by Fuji Photo Film Co., Ltd.) having a thickness of 90 μm was cut into a size of a width of 70 mm and a length of 100 mm, and this was immersed in an aqueous sodium hydroxide solution (10% by weight) at 60° C. for 1 minute, and washed with distilled water to prepare an adherend.

The adherend was allowed to stand for 24 hours under the environment of 23° C.×50% RH, to obtain an adherend for assessing an adhesive strength. And then, a pressure-sensitive adhesive sheet which had been cut into a size of a width of 25 mm and a length of 100 mm was laminated on the aforementioned adherend for assessment at a pressure of 0.25 MPa to prepare an assessment sample.

After allowed to stand for 30 minutes under the environment of 23° C.×50% RH after lamination, an adhesive strength when peeled at a peeling rate of 10 m/min and a peeling angle of 180° using a tensile tester was measured. Measurement was performed under the environment of 23° C.×50% RH.

The above results are shown in Table 1.

TABLE 1

|  | peeling electrification voltage [kV] | staining property [-] | adhesive strength [N/25 mm] |
|---|---|---|---|
| Example 1 | −0.3 | ○ | 0.7 |
| Example 2 | −0.5 | ○ | 0.6 |
| Example 3 | −0.5 | ○ | 0.5 |
| Example 4 | −0.4 | ○ | 0.9 |
| Comparative Example 1 | −1.7 | ○ | 1.1 |
| Comparative Example 2 | −0.1 | × | 0.5 |
| Comparative Example 3 | 0.0 | × | 0.4 |
| Comparative Example 4 | 0.0 | × | 0.4 |
| Example 5 | −0.2 | ○ | 1.2 |

From the results of Table 1 above, it was revealed that when the pressure-sensitive adhesive composition comprising an ethylene oxide group-containing compound and an alkali metal salt prepared according to the present invention was used (Examples 1 to 5), the absolute value of peeling electrification voltage of the polarizing plate was suppressed to a low value of 1.0 kV or less, and staining of the polarizing plate as an adherend did not occur in any Example.

On the other hand, when the ethylene oxide group-containing compound is not contained (Comparative Example 1), staining of the polarizing plate was not recognized, but the absolute value of peeling electrification voltage was a value as high as 1.0 kV or more. In addition, when propylene glycol (ethylene oxide group content: 0% by weight) was used in place of the ethylene oxide group-containing compound (Comparative Example 2), when the alkali metal salt was not contained (Comparative Example 3), and when a pressure-sensitive adhesive composition comprising the alkali metal salt incorporated in an amount of 1 part by weight or more based on 100 parts by weight of the acrylic polymer was used (Comparative Example 4), the peeling electrification voltage was suppressed at low levels, but staining of the polarizing plate was recognized. Accordingly, it was revealed that any pressure-sensitive adhesive compositions in the Comparative Examples cannot satisfy suppression of peeling electrification voltage and suppression of staining of the polarizing plate simultaneously, and are not suitable as those for antistatic pressure-sensitive adhesive sheets.

In addition, in pressure-sensitive adhesive sheets of Examples 1 to 5 of the present invention, a 180° peeling adhesive strength at a peeling rate of 10 m/min is in a range of 0.1 to 6 N/25 mm, and it is seen that the sheet is a pressure-sensitive adhesive sheet which can be applied as a re-peeling type surface protecting film.

Accordingly, it could be confirmed that the pressure-sensitive adhesive composition of the present invention is a pressure-sensitive adhesive composition excellent in antistatic properties upon peeling and in adhesion reliance with a reduction in staining of an adherend.

What is claimed is:

1. A pressure-sensitive adhesive composition, which comprises a (meth)acryl-based polymer containing, as a main component, a (meth)acryl-based monomer having an alkyl group of a carbon number of 6 to 14, wherein the pressure-sensitive adhesive composition contains an ethylene oxide group-containing compound and an alkali metal salt, and the alkali metal salt is contained at an amount of less than 1 part by weight relative to 100 parts by weight of the (meth)acryl-based polymer,
   wherein the (meth)acryl-based polymer has a weight average molecular weight of 100,000 to 5,000,000 and the ethylene oxide group-containing compound has a number average molecular weight of 10,000 or less, and wherein the (meth)acryl-based polymer has an acid value of 29 or less.

2. The pressure-sensitive adhesive composition according to claim 1, wherein the content of the ethylene oxide group in the ethylene oxide group-containing compound is 5 to 85% by weight.

3. The pressure-sensitive adhesive composition according to claim 1, wherein the alkali metal salt is a lithium salt.

4. The pressure-sensitive adhesive composition according to claim 1, wherein the (meth)acryl-based polymer further contains a (meth)acryl-based monomer having a hydroxyl group.

5. A pressure-sensitive adhesive layer, which is formed by crosslinking a pressure-sensitive adhesive composition as defined in claim 1.

6. A pressure-sensitive adhesive sheet comprising a pressure-sensitive adhesive layer, which is formed by crosslinking a pressure-sensitive adhesive composition as defined in claim 1 on one side or both sides of a support.

7. A surface protecting film comprising a pressure-sensitive adhesive layer, which is formed by crosslinking a pressure-sensitive adhesive composition as defined in claim 1 on one side or both sides of a support which is provided with an antistatic-treated plastic film.

8. A pressure-sensitive adhesive layer, which is formed by crosslinking a pressure-sensitive adhesive composition as defined in claim 2.

9. A pressure-sensitive adhesive layer, which is formed by crosslinking a pressure-sensitive adhesive composition as defined in claim 3.

10. A pressure-sensitive adhesive layer, which is formed by crosslinking a pressure-sensitive adhesive composition as defined in claim 4.

11. A pressure-sensitive adhesive sheet comprising a pressure-sensitive adhesive layer, which is formed by crosslinking a pressure-sensitive adhesive composition as defined in claim 2 on one side or both sides of a support.

12. A pressure-sensitive adhesive sheet comprising a pressure-sensitive adhesive layer, which is formed by crosslinking a pressure-sensitive adhesive composition as defined in claim 3 on one side or both sides of a support.

13. A pressure-sensitive adhesive sheet comprising a pressure-sensitive adhesive layer, which is formed by crosslinking a pressure-sensitive adhesive composition as defined in claim 4 on one side or both sides of a support.

14. A surface protecting film comprising a pressure-sensitive adhesive layer, which is formed by crosslinking a pressure-sensitive adhesive composition as defined in claim 2 on one side or both sides of a support which is provided with an antistatic-treated plastic film.

15. A surface protecting film comprising a pressure-sensitive adhesive layer, which is formed by crosslinking a pressure-sensitive adhesive composition as defined in claim 3 on one side or both sides of a support which is provided with an antistatic-treated plastic film.

16. A surface protecting film comprising a pressure-sensitive adhesive layer, which is formed by crosslinking a pressure-sensitive adhesive composition as defined in claim 4 on one side or both sides of a support which is provided with an antistatic-treated plastic film.

17. The pressure-sensitive adhesive composition according to claim 2, wherein the ethylene oxide group-containing compound is contained in an amount of 0.1 to 20 parts by weight relative to 100 parts by weight of a (meth)acryl-based polymer.

18. The pressure-sensitive adhesive layer according to claim 5, wherein the layer is formed by
   coating the pressure-sensitive adhesive composition onto a support;
   drying this to remove a polymerization solvent to form a pressure-sensitive adhesive layer on the support;
   and crosslinking the pressure-sensitive adhesive composition on the support.

19. A pressure-sensitive adhesive composition exhibiting suppression of staining on a subject to be protected and electrification property, comprising:
   a (meth)acryl-based polymer containing, as a main component, a (meth)acryl-based monomer having an alkyl group of a carbon number of 6 to 14;
   an ethylene oxide group-containing compound which is contained in an amount of 0.01 to 40 parts by weight relative to 100 parts by weight of the (meth)acryl-based polymer; and
   an alkali metal salt which is contained in an amount of less than 1 part by weight relative to 100 parts by weight of the (meth)acryl-based polymer,
   wherein the (meth)acryl-based polymer has a weight average molecular weight of 100,000 to 5,000,000 and the ethylene oxide group-containing compound has a number average molecular weight of 10,000 or less, and wherein the (meth)acryl-based polymer has an acid value of 29 or less.

20. The pressure-sensitive adhesive composition according to claim 19, wherein the ethylene oxide group-containing compound has an ethylene oxide group in an amount of 5 to 85% by weight and has a number average molecular weight of 10,000 or less.

21. The pressure-sensitive adhesive composition according to claim 19, wherein the alkali metal salt is a lithium salt.

22. The pressure-sensitive adhesive composition according to claim 19, wherein the (meth)acryl-based polymer further contains a (meth)acryl-based monomer having a hydroxyl group as an essential component.

* * * * *

UNITED STATES PATENT AND TRADEMARK OFFICE
CERTIFICATE OF CORRECTION

PATENT NO. : 8,092,907 B2
APPLICATION NO. : 11/226956
DATED : January 10, 2012
INVENTOR(S) : Natsuki Kobayashi et al.

It is certified that error appears in the above-identified patent and that said Letters Patent is hereby corrected as shown below:

At Page 1, (Item 56), Column 2, Line 30, Under Other Publications, please change "AN" to --Class A14, AN--.

At Page 2, (Item 56), Column 2, Line 19, Under Other Publications, please change "Oct. 14," to --Oct. 15,--.

At Page 2, (Item 56), Column 2, Line 41, Under Other Publications, please change ""Electric" to --"Electrical--.

At Column 6, Line 67, please change "itaconeimide." to --itaconimide.--.

At Column 8, Line 61, please change "Li(C$_2$FsSO$_2$)$_2$N," to --Li(C$_2$F$_5$SO$_2$)$_2$N,--.

At Column 9, Line 17, please change "acrly" to --acryl--.

At Column 9, Line 18, please change "melanine" to --melamine--.

At Column 10, Line 28, please change "polyfunctinal" to --polyfunctional--.

At Column 10, Line 29, please change "diethlene" to --diethylene--.

At Column 10, Line 35, please change "polyfunctinoal" to --polyfunctional--.

At Column 15, Line 2, please change "2001" to --200--.

Signed and Sealed this
Thirty-first Day of July, 2012

David J. Kappos
*Director of the United States Patent and Trademark Office*